United States Patent
Roth et al.

(10) Patent No.: US 10,730,372 B2
(45) Date of Patent: Aug. 4, 2020

(54) RAMP DOOR WITH SELF-DEPLOYING RAIL

(71) Applicant: Lippert Components, Inc., Elkhart, IN (US)

(72) Inventors: Bryan J. Roth, Topeka, IN (US);
Kevin Peachey, Elkhart, IN (US);
Jeremiah Otto, Elkhart, IN (US);
Jeremiah R. Bradley, Nappanee, IN (US)

(73) Assignee: LIPPERT COMPONENTS, INC., Elkhart, IN (US)

(*) Notice: Subject to any disclaimer, the term of this patent is extended or adjusted under 35 U.S.C. 154(b) by 28 days.

(21) Appl. No.: 16/292,497

(22) Filed: Mar. 5, 2019

(65) Prior Publication Data

US 2019/0270364 A1    Sep. 5, 2019

Related U.S. Application Data

(60) Provisional application No. 62/638,546, filed on Mar. 5, 2018.

(51) Int. Cl.
| | | |
|---|---|---|
| *B60J 5/10* | (2006.01) | |
| *B60P 3/34* | (2006.01) | |
| *B60P 1/43* | (2006.01) | |
| *E04F 11/18* | (2006.01) | |

(52) U.S. Cl.
CPC ............... *B60J 5/107* (2013.01); *B60J 5/102* (2013.01); *B60P 1/435* (2013.01); *B60P 3/34* (2013.01); *E04F 11/18* (2013.01)

(58) Field of Classification Search
CPC .... B60P 1/435; B60P 3/34; B60P 3/36; B60R 3/007; B60R 3/02; B60J 5/102; B60J 5/107; E04B 1/003; E04B 1/18; E04F 11/1812; E04F 11/18; E04F 11/02; E04F 11/1865; E05F 15/627
See application file for complete search history.

(56) References Cited

U.S. PATENT DOCUMENTS

| | | | | |
|---|---|---|---|---|
| 4,037,564 | A * | 7/1977 | Schrock | B60P 1/435 296/61 |
| 4,596,417 | A * | 6/1986 | Bennett | B60P 1/435 296/61 |
| 6,736,446 | B1 * | 5/2004 | Johnson | B60P 3/36 296/162 |
| 7,686,381 | B1 * | 3/2010 | Leonard | B60P 3/343 296/162 |
| 7,841,645 | B2 | 11/2010 | Diamond et al. | |
| 8,365,472 | B2 | 2/2013 | Grimaldi | |

(Continued)

FOREIGN PATENT DOCUMENTS

EP    1 644 591    1/2008

*Primary Examiner* — Gregory A Blankenship
(74) *Attorney, Agent, or Firm* — Nixon & Vanderhye P.C.

(57) ABSTRACT

A ramp door and door frame include a rail kit that deploys automatically when the door is opened and collapses automatically when the door is closed. The door is supported by a cable mechanism when the door is opened. The cable mechanism causes an end rail to pivot up and away from the door when the door is opened and down and toward the door when the door is closed. The end rail cooperates with a door frame to deploy flexible side barriers when the door is opened and to collapse the side barriers when the door is closed.

15 Claims, 4 Drawing Sheets

(56) References Cited

U.S. PATENT DOCUMENTS

| | | | |
|---|---|---|---|
| 2006/0006693 A1* | 1/2006 | Anderson | B60P 3/36 296/162 |
| 2008/0296922 A1* | 12/2008 | Diamond | B60P 3/34 296/26.13 |
| 2016/0096465 A1* | 4/2016 | Kauffman | B60P 3/36 296/162 |
| 2018/0022262 A1* | 1/2018 | Roth | E04F 15/02 296/162 |
| 2018/0056845 A1* | 3/2018 | Ousley | B60P 3/34 |
| 2019/0270364 A1* | 9/2019 | Roth | B60P 1/435 |

* cited by examiner

RAMP DOOR WITH SELF-DEPLOYING RAIL

CROSS-REFERENCES TO RELATED APPLICATIONS

This application claims the benefit of U.S. Provisional Patent Application No. 62/638,546, filed Mar. 5, 2018, the entire content of which is herein incorporated by reference.

STATEMENT REGARDING FEDERALLY SPONSORED RESEARCH OR DEVELOPMENT (NOT APPLICABLE)

BACKGROUND AND SUMMARY

A recreational vehicle (RV) may include a ramp door providing access between the interior of the RV and the environment about the RV. Such a ramp door typically is pivotally mounted to the RV proximate a floor thereof and pivotable about an axis parallel to and substantially flush with the floor. In a closed or stowed position, the ramp door may form a wall or a portion of a wall of the RV. For example, a ramp door may form a rear wall or a portion of a rear wall of an RV when closed.

The ramp door may be opened or deployed to a ramp position wherein the free end of the ramp door is adjacent the ground upon which the RV is parked. In this position, the ramp door may facilitate loading and unloading items to and from the interior of the RV.

In some embodiments, the ramp door may be partially opened or deployed to a position in which the ramp door is generally parallel to the floor of the RV. In this position, the ramp door may serve as a patio deck.

When the ramp door is used as a patio deck, a railing typically is installed about the perimeter of the ramp door except at the end of the door pivotally connected to the RV. Typically, at least portions of such railings must be removed from the ramp door prior to closing the door. When removed, such portions of the railing must be stored, for example, inside the RV. Conversely, when the ramp door is deployed to the patio deck configuration, the railing must be removed from its storage location and installed on the ramp door. These tasks may be time-consuming and may require two or more persons to accomplish.

In an exemplary embodiment, a self-deploying rail system is provided for a ramp door with a door frame. The ramp door has a first side, a second side, a pivot end, and a free end, and the door is pivotable about the pivot end between a first position in which the door is substantially received within or substantially in abutment with the door frame and a second position in which the door is pivoted to an open position.

The system includes a substantially rigid barrier frame having a first end, a second end, a pivot end and a free end. The pivot end of the frame is pivotably connectable to the door proximate the free end of the door and pivotable between a first position in which the barrier frame is substantially parallel to the door and a second position in which the barrier frame is substantially perpendicular to the door. A first side panel is pivotably connected to the first end of the barrier frame about a first side panel pivot axis, and a second side panel is pivotably connected to the second end of the barrier frame about a second side panel pivot axis.

A first brace has a first end pivotably connected to the barrier frame proximate the first end and the free end thereof, and a second end pivotably connectable to the door between the free end and the pivot end thereof. The first brace includes a first member and a second member, where the first member is articulable with respect to the second member about a first pivot point between a first position in which the first member is substantially articulated about the first pivot point with respect to the second member, and a second position in which the first member extends substantially linearly from the second member.

A second brace has a first end pivotably connected to the barrier frame proximate the second end and the free end thereof and a second end pivotably connectable to the door between the free end and the pivot end thereof. The second brace includes a third member and a fourth member, where the third member is articulable with respect to the fourth member about a second pivot point between a first position in which the third member is substantially articulated about the second pivot point with respect to the fourth member, and a second position in which the third member extends substantially linearly from the fourth member.

A first side barrier has a first end connectable to the door frame and a second end connected to the first side panel, where at least a portion of the first side barrier is made of a substantially flexible material. A second side barrier has a first end connectable to the door frame and a second end connected to the second side panel, where at least a portion of the second side barrier made of a substantially flexible material.

A first cable has a first end connectable to the door frame and a second end connected to the first brace proximate the pivot point thereof. A second cable has a first end connectable to the door frame and a second end connected to the second brace proximate the pivot point thereof.

In another exemplary embodiment, the self-deploying rail system includes an end rail portion having a frame assembly pivotable between a stowed position and an upright position. The frame assembly includes a left corner post and a right corner post. A pair of first side panels are pivotably coupled with the frame assembly adjacent the left and right corner posts, respectively, and the first side panels are biased inward. A pair of second side panels are pivotably coupleable with the door frame and are biased inward. A pair of upper cables are one each connected between each of the first and second side panels, and a pair of lower cables are one each connected between each of the first and second side panels. A pair of folding arm braces respectively pivotably connected at a first end to the left and right corner posts and pivotably connectable at a second end to the ramp door. The folding arm braces each include a first arm pivotably connected to a second arm at a brace pivot joint. A pair of deploy cables are respectively connected at one end to the folding arm braces and are connectable at an opposite end to the door frame.

BRIEF DESCRIPTION OF THE DRAWINGS

These and other aspects and advantages will be described in detail with reference to the accompanying drawings, in which.

DETAILED DESCRIPTION

Figure 1:
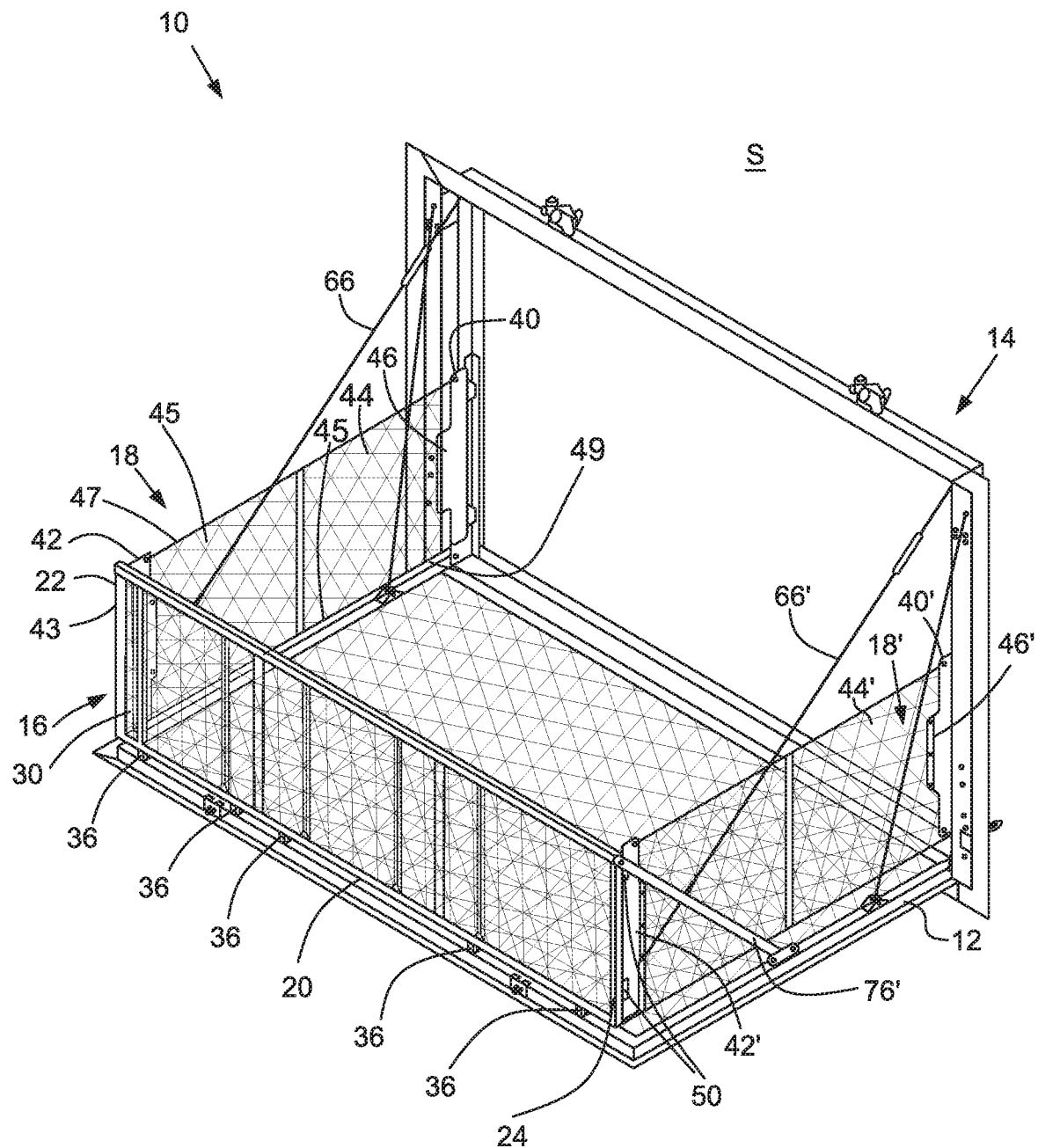
FIG. 1 is a perspective view of a system including door frame, a door, and a self-deploying rail according to the present disclosure.

The drawings show illustrative embodiments of a system 10 including a ramp door 12 pivotable with respect to a structure S, for example, an RV, a rail (or barrier) system pivotally attached to the ramp door, and an operating mechanism operable, in response to pivoting of the ramp door, to reposition portions of the rail system between a first (or collapsed) position in which the portions of the rail system are generally collapsed against the ramp door and a second (or deployed) position in which the portions of the rail system are generally perpendicular to the ramp door.

The ramp door 12 is shown as a panel P having a first (or connected or pivot) end pivotally attached to a door frame or hoop 14, a second (or free) end opposite the connected end, and first and second (or left and right) opposed sides extending between the first end and the second ends. The hoop 14 is configured for attachment to the structure S. The pivotal connection of the ramp door 12 to the hoop 14 may be made using one or more hinges (not shown) connected between the ramp door and the hoop proximate the bottom of the hoop. In other embodiments, the ramp door 12 could be pivotally attached to the RV or other structure in other ways. For example, the ramp door 12 could be pivotally attached to the floor or frame of the RV proximate the hoop 14.

As shown, the rail system includes an end rail portion 16 and first and second (or left and right) side rail portions 18, 18'. The end rail portion 16 includes a peripheral frame pivotally connected by hinges 36 to the ramp door 12 proximate the free end thereof. The peripheral frame includes a bottom rail 20, a first corner post 22 having a first or lower end connected to the bottom rail proximate a first end thereof, a second corner post 24 having a first or lower end connected to the bottom rail proximate a second end thereof, and a top rail 28 connected to second or upper ends of the first and second corner posts 22, 24. The end rail portion may include one or more intermediate posts 26 located intermediate the first and second corner posts 22, 24 and connected to the bottom rail 20 and the top rail 28 intermediate the first and second ends thereof.

The end rail portion may be provided in multiple sections, each including a corresponding section of each of the bottom rail 20 and the top rail 28. For example, as shown, the end rail portion 16 may include a first section adjacent the first side of the ramp door 12, a second section adjacent the second side of the ramp door, and a third section intermediate the first section and the second section. The first end rail section includes a peripheral frame defined by the first corner post 22, a first intermediate post 26, and corresponding sections of the bottom rail 20 and the top rail 28. The second end rail section includes a peripheral frame defined by the second corner post 24, a second intermediate post 26, and corresponding sections of the bottom rail 20 and the top rail 28. The third end rail section includes a peripheral frame defined by a third intermediate post 26, a fourth intermediate post 26, and corresponding sections of the bottom rail 20 and the top rail 28. The third end rail section may be slidingly or pivotally associated with the first and/or the second end rail section such that the intermediate section may function as a gate that may be open and closed to selectively provide or inhibit access to the ramp door from outside the end rail portion. For example, the gate may provide selective access to the ramp door from a stair connected to the free end of the ramp door outside the rail system and extending between the ramp door and the ground upon which the RV is situated.

The end rail portion 16 also includes a barrier panel 30 connected between the bottom rail 20, the top rail 28, and the posts 22, 24, 26 defining the peripheral frame or the sections thereof. As shown, the barrier panel 30 may be embodied in sections as one or more mesh or screen elements sufficiently robust to resist a lateral force to the barrier panel, for example, a lateral force applied the barrier panel by a user located on the ramp door. In another embodiment (not shown), the barrier panel 30 could be embodied as a plurality of intermediate rails (not shown), each having first and second ends connected, respectively, to the first and second corner posts 22, 24, to the first and second intermediate posts 26, to an intermediate post and the first corner post, and/or to an intermediate post and the second corner post.

The first and second side rail portions 18, 18' may be identical to or mirror images of each other. As such, only the first side rail portion 18 will be discussed in detail herein. Features of the first side rail portion 18 generally are identified herein with unprimed reference signs (for example, 18), and like features of the second side rail portion 18' generally are identified herein with primed reference signs (for example, 18').

The first side rail portion 18 includes a first side panel 40 pivotally connected to a first jamb of the hoop 14, a second side panel 42 pivotally connected to the first corner post 22, and a flexible barrier panel 44 connected between the first side panel and the second side panel.

The first side panel 40 is generally planar, generally rectangular, and elongate. A first elongate side of the first side panel 40 is pivotally connected to the first jamb, for example, by one or more hinges 41 connected therebetween. A biasing mechanism (not visible) may be provided in connection with one or more of the hinges 41 to rotationally bias the first side panel 40 toward a position wherein the free end thereof is directed toward the opposite jamb or corner post. The biasing mechanism could be embodied as a torsion spring incorporated into the respective hinge 41 or in any other suitable manner. An elongated and shallow tab 46 extends peripherally outwardly from a second elongate side of the first side panel 40 opposite the first elongate side of the first side panel.

The second side panel 42 generally is the mirror image of the first side panel 40 except that the second side panel further defines an elongated slot 48 extending diagonally upwardly from a lower corner of the free edge of the second side panel toward an opposed upper corner of the pivotally connected edge of the second side panel 42. A first elongate side of the second side panel 42 is pivotally connected to the first corner post 22, by one or more hinges 43 connected therebetween. A biasing mechanism (not visible) may be provided in connection with one or more of the hinges 43 to rotationally bias the second side panel 42 toward a position wherein the free end thereof is directed toward the opposite corner post. The biasing mechanism could be embodied as a torsion spring incorporated into the respective hinge 43 or in any other suitable manner. An elongated and shallow tab 46 extends peripherally outwardly from a second elongate side of the second side panel 42 opposite the first elongate side of the second side panel.

The barrier panel 44 may be embodied as a flexible member, for example, a mesh or screen, sufficiently robust to restrain a user applying a lateral force to the barrier panel. As shown, the barrier panel 44 includes an upper cable 47 extending from an upper portion of the first side panel 40 to an upper portion of the second side panel 42, a lower cable 49 extending from a lower portion of the first side panel to a slider 51 engaged with the slot 48 defined by the second side panel, and a fabric barrier 45 connected to the upper and lower cables 47, 49.

A folding arm mechanism or brace 76 is connected between the free end of the first corner post 22 and the ramp door 12 proximate the first side of the door. More specifically, a first arm 76A of the folding arm mechanism 76 is pivotally connected to the free end of the first corner post 22 and a second arm 76B of the folding arm mechanism is pivotally connected to the ramp door 12 proximate the first side of the door and intermediate the pivot and free ends of the door. As shown, the second arm 76B is pivotally connected to the ramp door 12 by an intervening pivot bracket 77. The first arm 76A is pivotally connected to the second arm 76B. A locking bar 78 fixed to one of the first arm 76*a* and the second arm 76B selectively engages with the other of the first arm and the second arm to limit the extent to which the first arm may pivot with respect to the second arm. As shown, the locking bar 78 limits the extent to which the first arm 76A may pivot with respect to the second arm 76B within a range from a folded position wherein the first arm is substantially folded or nested against the second arm to an unfolded position wherein the first arm is substantially unfolded from and parallel to the second arm. A second folding arm mechanism 76' similar to the first folding arm mechanism is provided between the door 12 and the second corner post 24.

A first deploy cable 66 is connected between the hoop 14 (or the structure S proximate the hoop) and the folding arm mechanism 76 proximate the pivotal connection between the first arm 76A and the second arm 76B. As shown, the first cable 66 is connected between the hoop 14 and the first arm 76A proximate the pivotal connection between the first arm 76A and the second arm 76B. The first cable 66 may include a turnbuckle 68 connected between the ends therefor for adjusting the length of the cable. A second deploy cable 66' similar to the first cable 66 is similarly connected between the hoop 14 and the second folding arm mechanism 76'.

With the door 12 in the open position (as shown, for example, in FIGS. 1-3), the first and second cables 66, 66' may bear at least a portion of the weight of the door and any load thereon. The upper and lower cables 47, 49 of the side panel barrier systems may also bear at least a portion of the weight of the door 12 and any load thereon when the door is in the open position. More specifically, with the door 12 in the open position, the upper and lower cables 47, 49 of the side rail portions 18, 18' may be taut between the respective first and second side panels 40, 42, 40', 42', thereby providing resistance to further pivoting of the door 12 and thereby providing support for the door.

With door system 10 installed in the structure S, the door 12 may be selectively transitioned between a first, or closed, position and a second, or open position. In the closed position, the door 12 is received within or against the hoop 14. Also, with the door 12 in the closed position, the cables 66, 66' are slack and may droop within the hoop 14 or the structure S.

Figure 4:
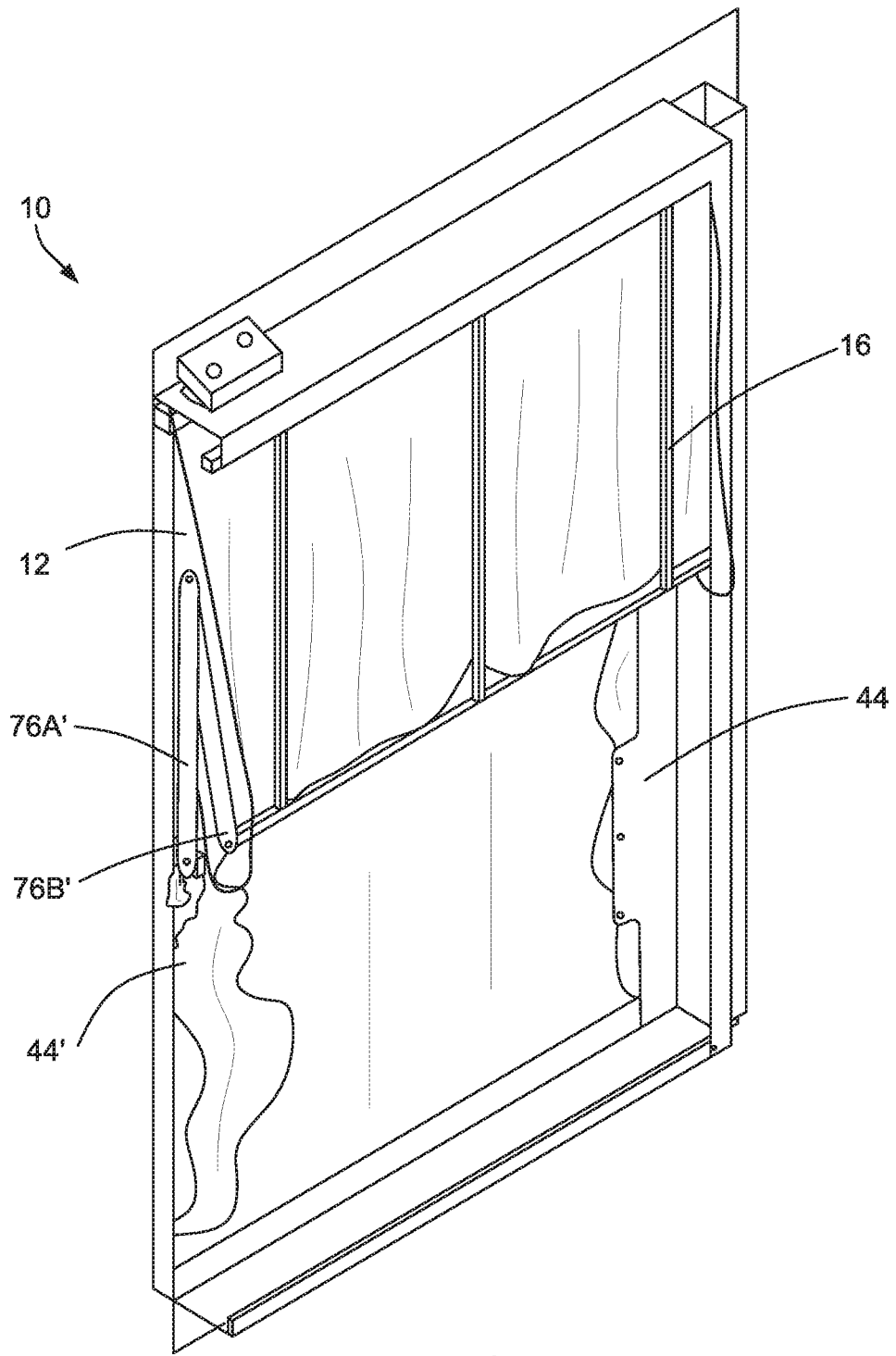
FIG. 4 is an interior perspective view of the system of FIG. 1 with the door in a closed position and the self-deploying rail in a collapsed position.

Further, with the door 12 in the closed position, as shown in FIG. 4, the folding arm mechanism 76 is folded upon itself so that the first arm 76A lies beside the second arm 76B, the end rail portion 16 lies against the door 12, the free ends of the first and second side panels 40, 42, 40', 42' of the side rail portions 18, 18' pivot toward the center of the hoop 14, and the flexible side barrier panels 40, 44' are slack and generally collapsed against the door 12. Also, the end rail portion 16 is collapsed against the door 12. This condition is best shown in FIG. 4.

Figure 2:
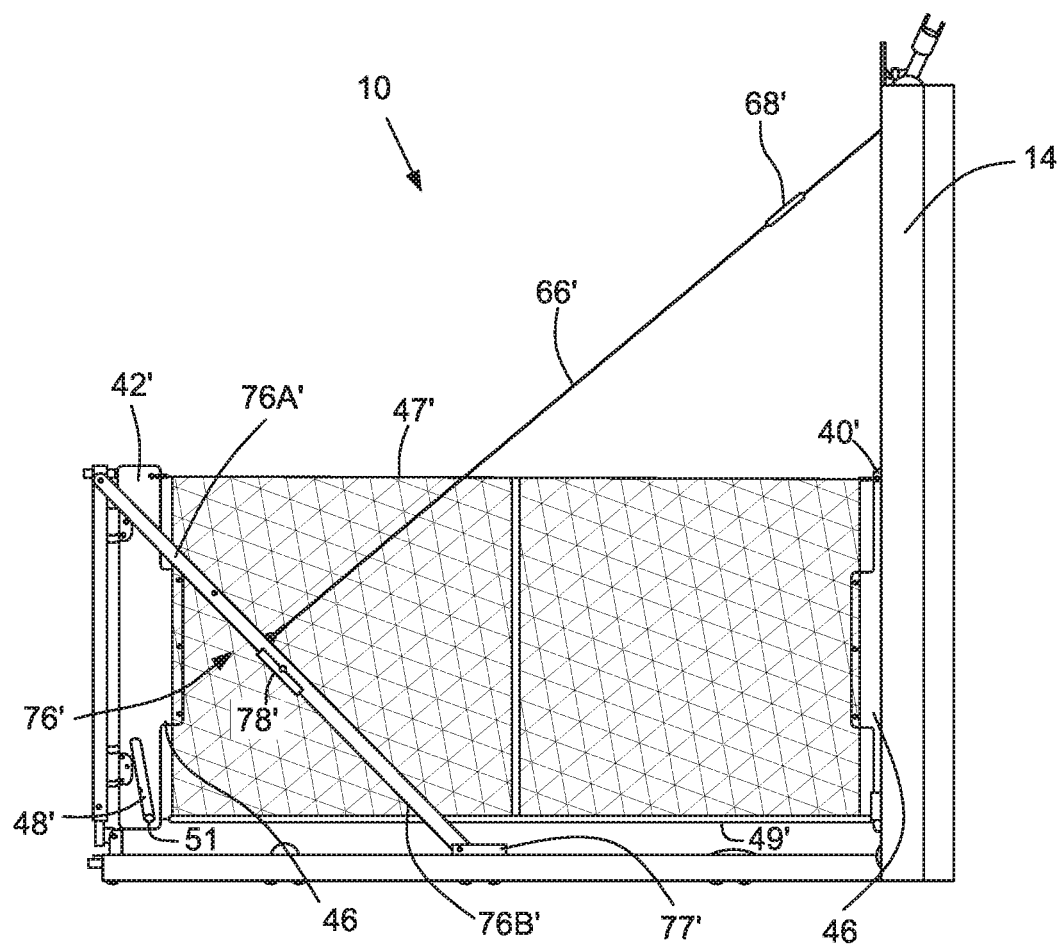
FIG. 2 is a side elevation view of the system of FIG. 1.
Figure 3:
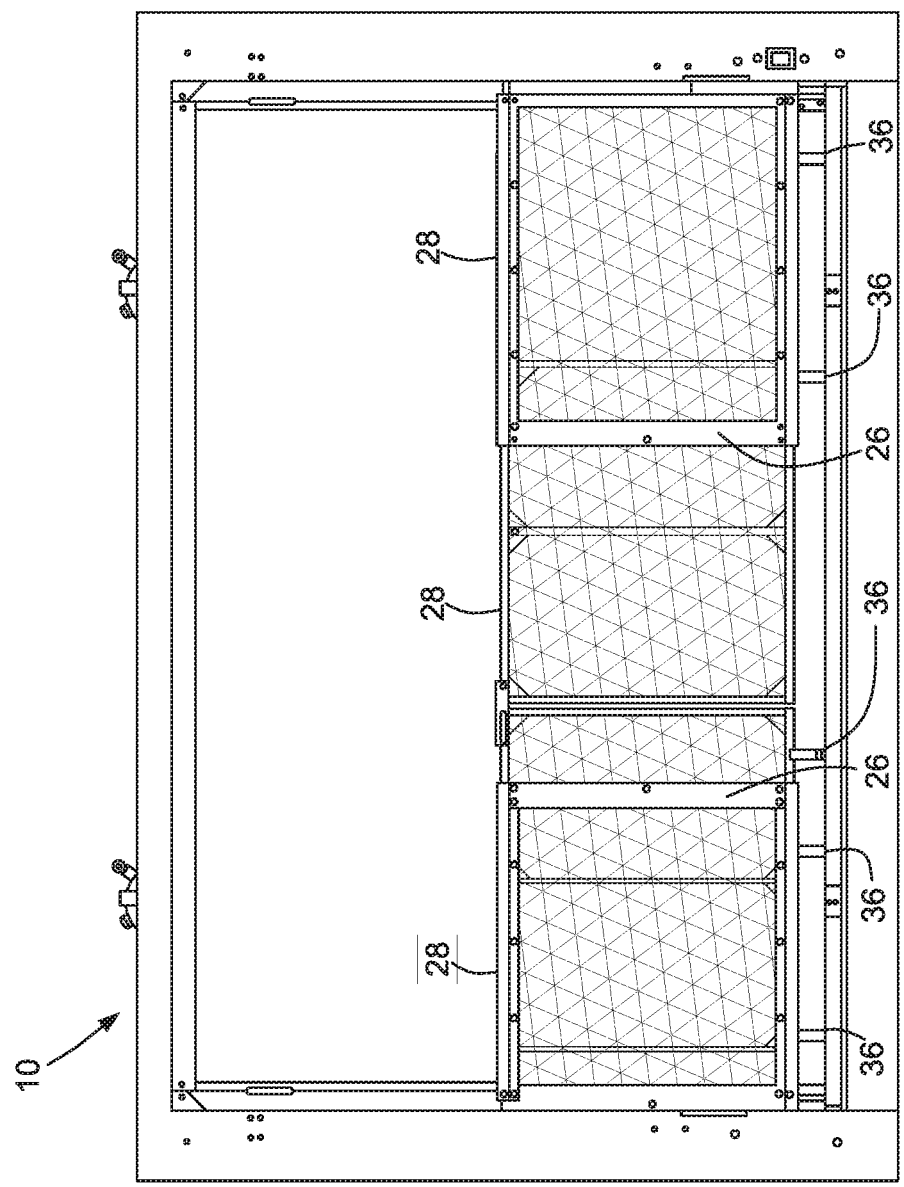
FIG. 3 is an end elevation view of the system of FIG. 1.

When the door 12 is transitioned from the closed position to the open position, the side barrier panels 44, 44' and their upper and lower cables 47, 49, 47', 49' cables become taut as the door approaches the open position. As the upper and lower cables 47, 49, 47', 49' cables become taut, they cause the corresponding first and second side panels 40, 42, 40', 42' to pivot against the force of the respective biasing mechanisms to or toward a state wherein the side panels are co-planar or otherwise parallel to each other, as best shown in FIGS. 1-3. Also, as the lower cables 49, 49' become taut, the respective sliders 51 slide from an upper portion of the respective slots 48, 48' to a lower portion of the respective slots in response to the tensioning of the lower cables.

Also, as the door 12 is transitioned from the closed position to the open position, the cables 66, 66' become taut. As the cables 66, 66' become taut, the cables cause the folding arm mechanisms 76, 76' to unfold to or toward a state wherein the first and second arms 76A, 76B, 76A', 76B' are unfolded and linearly aligned with each other (as best shown in FIGS. 1-3). As the folding arm mechanisms 76, 76' unfold, they transition the end panel 16 from the collapsed position against the door 12 to an upright position, where the end panel is generally perpendicular to the door.

When the door 12 is transitioned from the open position to the closed position, both the side barriers 18, 18' and the cables 66, 66' become slack as the door leaves the open position. As the side barriers 18, 18' slacken, the cables 47, 49, 47', 49' thereof slacken. As the cables 47, 49, 47', 49' slacken, the first side panels 40, 40' rotate to and toward a position coplanar with the hoop 14, and the second side panels 42, 42' rotate to and toward a position against the door 12. As the second side panels 42, 42' rotate to and toward a position against the door 12, the sliders 51, 51' slide toward and to the upper and of the slots 48, 48'. As the door 12 continues to close and the cables 47, 49, 47', 49' continue to slacken, the cables and the side barrier panels 44, 44' collapse against the door 12.

Also, as the cables 66, 66' slacken, the folding arm mechanisms 76, 76' begin to fold under their own weight. A biasing mechanism (not shown), for example, a torsion spring, could be provided in connection with the folding arm mechanisms 76, 76' to facilitate the initiation of the folding process. As the folding arm mechanisms 76, 76' fold, the end rail 16 pivots from the upright position to the collapsed position against the door.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A self-deploying rail system for a ramp door including a door frame, the ramp door having a first side, a second side, a pivot end, and a free end, the door pivotable about the pivot end between a first position in which the door is substantially received within or substantially in abutment with the door frame and a second position in which the door is pivoted to an open position, the system comprising:

a substantially rigid barrier frame having a first end, a second end, a pivot end and a free end, the pivot end of the frame pivotably connectable to the door proximate the free end of the door and pivotable between a first position in which the barrier frame is substantially parallel to the door and a second position in which the barrier frame is substantially perpendicular to the door;

a first side panel pivotably connected to the first end of the barrier frame about a first side panel pivot axis;

a second side panel pivotably connected to the second end of the barrier frame about a second side panel pivot axis;

a first brace having a first end pivotably connected to the barrier frame proximate the first end and the free end thereof, and a second end pivotably connectable to the door between the free end and the pivot end thereof, the first brace comprising a first member and a second member, the first member articulable with respect to the second member about a first pivot point between a first position in which the first member is substantially articulated about the first pivot point with respect to the second member, and a second position in which the first member extends substantially linearly from the second member;

a second brace having a first end pivotably connected to the barrier frame proximate the second end and the free end thereof, and a second end pivotably connectable to the door between the free end and the pivot end thereof, the second brace comprising a third member and a fourth member, the third member being articulable with respect to the fourth member about a second pivot point between a first position in which the third member is substantially articulated about the second pivot point with respect to the fourth member, and a second position in which the third member extends substantially linearly from the fourth member;

a first side barrier having a first end connectable to the door frame and a second end connected to the first side panel, at least a portion of the first side barrier made of a substantially flexible material;

a second side barrier having a first end connectable to the door frame and a second end connected to the second side panel, at least a portion of the second side barrier made of a substantially flexible material;

a first cable having a first end connectable to the door frame and a second end connected to the first brace proximate the pivot point thereof; and a second cable having a first end connectable to the door frame and a second end connected to the second brace proximate the pivot point thereof.

2. The system of claim 1, wherein each of the first cable and the second cable is relatively slack when the first brace and the second brace are in the respective first positions.

3. The system of claim 1, wherein each of the first cable and the second cable is relatively taut when the first brace and the second brace are in the respective second positions.

4. The system of claim 1 wherein the first side barrier comprises:
a first connector connected to the first side panel proximate the free end thereof; and
a second connector connected to the first side panel proximate the pivot end thereof.

5. The system of claim 4, the first side panel defining an elongated slot proximate the pivot end thereof, the second connector connected to the first side panel in sliding engagement with the slot.

6. The system of claim 5, the slot having a first end and a second end, the first end relatively near the pivot end of the barrier frame and relatively far from the first side panel pivot axis, and the second end relatively far from the pivot end of the barrier frame and relatively near the first side panel pivot axis.

7. The system of claim 1, wherein the second end of the first cable is connected to the second member of the first brace adjacent the first pivot point from a connection point of the first brace to the door.

8. The system of claim 1, wherein the first side panel is pivotably biased to pivot toward the second side panel.

9. The system of claim 1, the door frame further comprising:
a third side panel pivotably connectable to the door frame about a third side panel pivot axis; and
a fourth side panel pivotably connectable to the door frame about a fourth side panel pivot axis.

10. The system of claim 9, wherein the third side panel is pivotably biased to pivot toward the fourth side panel.

11. A self-deploying rail system for a ramp door including a door frame, the ramp door being pivotable in the door frame between a closed position and an open position, the system comprising:
an end rail portion including a frame assembly pivotable between a stowed position and an upright position, the frame assembly including a left corner post and a right corner post;
a pair of first side panels pivotably coupled with the frame assembly adjacent the left and right corner posts, respectively, the first side panels being biased inward;
a pair of second side panels pivotably coupleable with the door frame, the second side panels being biased inward;
a pair of upper cables one each connected between each of the first and second side panels;
a pair of lower cables one each connected between each of the first and second side panels;
a pair of folding arm braces respectively pivotably connected at a first end to the left and right corner posts and pivotably connectable at a second end to the ramp door, the folding arm braces each including a first arm pivotably connected to a second arm at a brace pivot joint; and
a pair of deploy cables respectively connected at one end to the folding arm braces and connectable at an opposite end to the door frame.

12. The system of claim 11, wherein the deploy cables are connected to the folding arm braces nearer to the brace pivot joint than to the first end or the second end of folding arm braces.

13. The system of claim 11, further comprising a barrier panel connected between each of the upper and lower cables.

14. The system of claim 11, wherein the barrier panels are flexible.

15. The system of claim 11, wherein the first side panels comprise an elongated slot therein extending at an angle, and wherein the lower cables are connected to the first side panels at a slider engaged in the elongated slot such that the lower cables are displaceable with the slider in the elongated slot.

* * * * *